United States Patent
Clayton et al.

(10) Patent No.: US 10,451,405 B2
(45) Date of Patent: Oct. 22, 2019

(54) DIMENSIONING SYSTEM FOR, AND METHOD OF, DIMENSIONING FREIGHT IN MOTION ALONG AN UNCONSTRAINED PATH IN A VENUE

(71) Applicant: SYMBOL TECHNOLOGIES, LLC, Lincolnshire, IL (US)

(72) Inventors: Richard Mark Clayton, Manorville, NY (US); Charles Burton Swope, Coral Springs, FL (US)

(73) Assignee: Symbol Technologies, LLC, Holtsville, NY (US)

( * ) Notice: Subject to any disclaimer, the term of this patent is extended or adjusted under 35 U.S.C. 154(b) by 54 days.

(21) Appl. No.: 15/358,810

(22) Filed: Nov. 22, 2016

(65) Prior Publication Data

US 2018/0143003 A1 May 24, 2018

(51) Int. Cl.
| | |
|---|---|
| *G06K 9/00* | (2006.01) |
| *G01B 11/02* | (2006.01) |
| *H04N 13/204* | (2018.01) |
| *G01B 11/00* | (2006.01) |
| *G01B 11/04* | (2006.01) |
| *G01S 17/42* | (2006.01) |
| *G01S 17/66* | (2006.01) |

(Continued)

(52) U.S. Cl.
CPC ............. *G01B 11/02* (2013.01); *G01B 11/00* (2013.01); *G01B 11/04* (2013.01); *G01S 5/16* (2013.01); *G01S 5/163* (2013.01); *G01S 17/42* (2013.01); *G01S 17/66* (2013.01); *G01S 17/87* (2013.01); *G01S 17/89* (2013.01); *G06T 7/292* (2017.01); *H04N 13/204* (2018.05); *G01S 17/36* (2013.01); *G06T 2207/10028* (2013.01)

(58) Field of Classification Search
CPC ...................... G06T 2207/10028; G01S 17/36
See application file for complete search history.

(56) References Cited

U.S. PATENT DOCUMENTS

| | | | |
|---|---|---|---|
| 5,408,322 A | 4/1995 | Hsu et al. | |
| 5,988,862 A | 11/1999 | Kacyra et al. | |

(Continued)

FOREIGN PATENT DOCUMENTS

| | | |
|---|---|---|
| CA | 2835830 A1 | 11/2012 |
| CN | 104200086 A | 12/2014 |

(Continued)

OTHER PUBLICATIONS

Vasiljevic et al (NPL "High-Accuracy Vehicle Localization for autonomous warehousing", reprint submitted to Robotics and Computer-Integrated Manufacturing May 9, 2016, p. 42.).*

(Continued)

*Primary Examiner* — Oneal R Mistry
(74) *Attorney, Agent, or Firm* — Yuri Astvatsaturov

(57) ABSTRACT

A ranging system captures successive point clouds from moving freight, and a tracking system tracks successive positions and orientations of the moving freight. A computing device correlates each successive point cloud with each successive position and orientation and time of the moving freight, combines the correlated point clouds to obtain a composite point cloud of the moving freight, and processes the composite point cloud to dimension the moving freight. Once the freight is dimensioned, it may, for example, be efficiently loaded into a container.

17 Claims, 8 Drawing Sheets

(51) Int. Cl.
  *G01S 17/87*   (2006.01)
  *G01S 17/89*   (2006.01)
  *G01S 5/16*    (2006.01)
  *G06T 7/292*   (2017.01)
  *G01S 17/36*   (2006.01)

(56) References Cited

U.S. PATENT DOCUMENTS

| | | |
|---|---|---|
| 6,115,114 A | 9/2000 | Berg et al. |
| 6,995,762 B1 | 2/2006 | Pavlidis et al. |
| 7,137,207 B2 | 11/2006 | Armstrong et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,726,575 B2 | 6/2010 | Wang et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,199,977 B2 | 6/2012 | Krishnaswamy et al. |
| 8,265,895 B2 | 9/2012 | Willins et al. |
| 8,284,988 B2 | 10/2012 | Sones et al. |
| 8,463,079 B2 | 6/2013 | Ackley et al. |
| 8,479,996 B2 | 7/2013 | Barkan et al. |
| 8,542,252 B2 | 9/2013 | Perez et al. |
| 8,599,303 B2 | 12/2013 | Stettner |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,989,342 B2 | 3/2015 | Liesenfelt et al. |
| 9,007,601 B2 | 4/2015 | Steffey et al. |
| 9,070,285 B1 | 6/2015 | Ramu |
| 9,129,277 B2 | 9/2015 | MacIntosh |
| 9,329,269 B2 | 5/2016 | Zeng |
| 9,396,554 B2 | 7/2016 | Williams et al. |
| 9,400,170 B2 | 7/2016 | Steffey |
| 9,549,125 B1 | 1/2017 | Goyal et al. |
| 9,562,971 B2 | 2/2017 | Shenkar et al. |
| 9,600,892 B2 | 3/2017 | Patel et al. |
| 9,778,388 B1 | 10/2017 | Connor |
| 9,791,862 B1 | 10/2017 | Connor |
| 9,938,092 B2 * | 4/2018 | McMurrough ............ G06T 7/10 |
| 2001/0041948 A1 | 11/2001 | Ross et al. |
| 2002/0164236 A1 | 7/2002 | Fukuhara et al. |
| 2002/0158453 A1 | 10/2002 | Levine |
| 2004/0240754 A1 | 2/2004 | Smith et al. |
| 2005/0016004 A1 | 1/2005 | Armstrong et al. |
| 2005/0114059 A1 | 5/2005 | Chang et al. |
| 2006/0106742 A1 | 5/2006 | Bocchicchio et al. |
| 2007/0074410 A1 | 4/2007 | Armstrong et al. |
| 2007/0272732 A1 | 11/2007 | Hindmon |
| 2008/0238919 A1 | 10/2008 | Pack |
| 2009/0088975 A1 | 4/2009 | Sato et al. |
| 2009/0103773 A1 | 4/2009 | Wheeler et al. |
| 2009/0152391 A1 | 6/2009 | McWhirk |
| 2009/0323121 A1 | 12/2009 | Valkenburg et al. |
| 2010/0026804 A1 | 2/2010 | Tanizaki et al. |
| 2010/0091094 A1 | 4/2010 | Sekowski |
| 2010/0118116 A1 | 5/2010 | Tomasz |
| 2010/0131234 A1 | 5/2010 | Stewart et al. |
| 2010/0208039 A1 | 8/2010 | Stettner |
| 2010/0295850 A1 | 11/2010 | Katz |
| 2010/0315412 A1 | 12/2010 | Sinha et al. |
| 2011/0047636 A1 | 2/2011 | Stachon et al. |
| 2011/0052043 A1 | 3/2011 | Hung |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0286007 A1 | 11/2011 | Pangrazio et al. |
| 2011/0310088 A1 | 12/2011 | Adabala et al. |
| 2012/0075342 A1 | 3/2012 | Choubassi et al. |
| 2012/0179621 A1 | 7/2012 | Moir et al. |
| 2012/0185112 A1 | 7/2012 | Sung et al. |
| 2012/0209553 A1 | 8/2012 | Doytchinov et al. |
| 2012/0236119 A1 | 9/2012 | Rhee |
| 2012/0249802 A1 | 10/2012 | Taylor |
| 2012/0250978 A1 | 10/2012 | Taylor |
| 2012/0287249 A1 | 11/2012 | Choo et al. |
| 2013/0144565 A1 | 6/2013 | Miller |
| 2013/0156292 A1 | 6/2013 | Chang et al. |
| 2013/0162806 A1 | 6/2013 | Ding et al. |
| 2013/0228620 A1 | 9/2013 | Ahern et al. |
| 2013/0236089 A1 | 9/2013 | Litvak et al. |
| 2013/0299306 A1 | 11/2013 | Jiang et al. |
| 2013/0299313 A1 | 11/2013 | Baek, IV et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi |
| 2014/0028837 A1 | 1/2014 | Gao et al. |
| 2014/0049616 A1 | 2/2014 | Stellner |
| 2014/0098094 A1 | 4/2014 | Neumann |
| 2014/0100813 A1 | 4/2014 | Showering |
| 2014/0104413 A1 | 4/2014 | McCloskey et al. |
| 2014/0192050 A1 | 7/2014 | Qiu |
| 2014/0267614 A1 | 9/2014 | Ding et al. |
| 2014/0267688 A1 | 9/2014 | Aich et al. |
| 2014/0300637 A1 | 10/2014 | Fan et al. |
| 2014/0351073 A1 | 11/2014 | Murphy et al. |
| 2015/0015602 A1 | 1/2015 | Beaudoin |
| 2015/0088618 A1 | 3/2015 | Basir et al. |
| 2015/0092066 A1 | 4/2015 | Geiss et al. |
| 2015/0106403 A1 | 4/2015 | Haverinen et al. |
| 2015/0154467 A1 | 6/2015 | Feng |
| 2015/0161793 A1 | 6/2015 | Takahashi |
| 2015/0181198 A1 | 6/2015 | Baele et al. |
| 2015/0379704 A1 | 12/2015 | Chandrasekar et al. |
| 2016/0044862 A1 | 2/2016 | Kocer |
| 2016/0061591 A1 | 3/2016 | Pangrazio et al. |
| 2016/0070981 A1 * | 3/2016 | Sasaki ............... B60R 1/00 348/148 |
| 2016/0012588 A1 | 4/2016 | Taguchi |
| 2016/0107690 A1 | 4/2016 | Oyama et al. |
| 2016/0150217 A1 | 5/2016 | Popov |
| 2016/0156898 A1 | 6/2016 | Ren et al. |
| 2016/0163067 A1 | 7/2016 | Williams |
| 2017/0004649 A1 | 1/2017 | Collet Romea et al. |
| 2017/0041553 A1 | 2/2017 | Cao et al. |
| 2017/0150129 A1 | 5/2017 | Pangrazio |
| 2017/0227647 A1 | 8/2017 | Baik |
| 2017/0228885 A1 | 8/2017 | Baumgartner |
| 2017/0280125 A1 * | 9/2017 | Brown ............... B65G 1/00 |
| 2018/0068266 A1 * | 3/2018 | Kirmani ............ G06Q 10/0833 |
| 2018/0290845 A1 * | 10/2018 | McMurrough ............ G06T 7/10 |

FOREIGN PATENT DOCUMENTS

| | | |
|---|---|---|
| EP | 2439487 A1 | 4/2012 |
| EP | 2562688 A2 | 2/2013 |
| EP | 2693362 A1 | 2/2014 |
| WO | 2003/002935 A1 | 1/2003 |
| WO | 2008/057504 A2 | 5/2008 |
| WO | 2008/154611 A2 | 12/2008 |
| WO | 2013/165674 | 11/2013 |
| WO | 2014/092552 A2 | 6/2014 |
| WO | 2015/127503 A1 | 9/2015 |
| WO | 2016/020038 A1 | 2/2016 |

OTHER PUBLICATIONS

"Fair Billing with Automatic Dimensioning" pp. 1-4, undated, Copyright Mettler-Toledo International Inc.
"Swift Dimension" Trademark Omniplanar, Copyright 2014.
"Plane Detection in Point Cloud Data" dated Jan. 25, 2010 by Michael Ying Yang and Wolfgang Forstner, Technical Report 1, 2010, University of Bonn.
Brown et al., U.S. Appl. No. 15/078,074, filed Mar. 23, 2016.

(56) References Cited

OTHER PUBLICATIONS

Brown et al., U.S. Appl. No. 15/008,710, filed Jan. 28, 2016.
Lecking et al., "Localization in a wide range of industrial environments using relative 3D ceiling features," IEEE, pp. 333-337, Sep. 15, 2008.
Carreira et al., "Enhanced PCA-based localization using depth maps with missing data," IEEE, pp. 1-8 ,Apr. 24, 2013.
Fu et al., U.S. Appl. No. 15/385,113, filed Dec. 20, 2016.
Swope et al., U.S. Appl. No. 15/015,228, filed Feb. 4, 2016.
Ziang Xie et al., "Multimodal Blending for High-Accuracy Instance Recognition", 2013 IEEE/RSJ International Conference on Intelligent Robots and Systems, pp. 2214-2221.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Federico Tombari et al. "Multimodal cue integration through Hypotheses Verification for RGB-D object recognition and 6DOF pose estimation", IEEE International Conference on Robotics and Automation, Jan. 2013.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Gu et al., U.S. Appl. No. 15/242,126, filed Aug. 19, 2016.
Dubois, M., et al., "A comparison of geometric and energy-based point cloud semantic segmentation methods," European Conference on Mobile Robots (ECMR), vol., no., pp. 88-93, Sep. 25-27, 2013.
Lari, Z., et al., "An adaptive approach for segmentation of 3D laser point cloud." International Archives of the Photogrammetry, Remote Sensing and Spatial Information Sciences, vol. XXXVIII-5/W12, 2011, ISPRS Calgary 2011 Workshop, Aug. 29-31, 2011, Calgary, Canada.
Rusu, et al. "Spatial change detection on unorganized point cloud data," PCL Library, retrieved from Internet on Aug. 19, 2016 [http://pointclouds.org/documentation/tutorials/octree_change.php].
Tahir, Rabbani, et al., "Segmentation of point clouds using smoothness constraint," International Archives of Photogrammetry, Remote Sensing and Spatial Information Sciences 36.5 (Sep. 2006): 248-253.
Golovinskiy, Aleksey, et al. "Min-cut based segmentation of point clouds." Computer Vision Workshops (ICCV Workshops), 2009 IEEE 12th International Conference on. IEEE, 2009.
Douillard, Bertrand, et al. "On the segmentation of 3D LIDAR point clouds." Robotics and Automation (ICRA), 2011 IEEE International Conference on. IEEE, 2011.
Puwein, J., et al., "Robust multi-view camera calibration for wide-baseline camera networks," in IEEE Workshop on Applications of Computer Vision (WACV), Jan. 2011.
Datta, A., et al., "Accurate camera calibration using iterative refinement of control points," in Computer Vision Vorkshops (ICCV Workshops), 2009.
Olson, Clark F., et al. "Wide-Baseline Stereo Vision for Terrain Mapping" in Machine Vision and Applications, Aug. 2010.
Rusu, et al., "How to incrementally register pairs of clouds," PCL Library, retrieved from the Internet on Aug. 22, 2016 from <http://pointclouds.org/documentation/tutorials/pairwise_incremental_registration.php>.
Zheng et al., U.S. Appl. No. 15/131,856, filed Apr. 18, 2016.
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Schnabel et al. "Efficient Ransac for Point-Cloud Shape Detection", vol. 0, No. 0, pp. 1-12.
Buenaposada et al. "Real-time tracking and estimation of plane pose" Proceedings of the ICPR (Aug. 2002) vol. II, IEEE pp. 697-700.
International Search Report and Written Opinion for International Patent Application No. PCT/US2017/024847 dated Jul. 7, 2017.
International Search Report and Written Opinion for International Patent Application No. PCT/US2017/057669 dated Jan. 3, 2018.

\* cited by examiner

DIMENSIONING SYSTEM FOR, AND METHOD OF, DIMENSIONING FREIGHT IN MOTION ALONG AN UNCONSTRAINED PATH IN A VENUE

BACKGROUND OF THE INVENTION

The present disclosure relates generally to a dimensioning system for, and a method of, dimensioning freight in motion along an unconstrained path in a venue, and, more particularly, to dimensioning the freight while the freight is being moved by a freight mover, such as an industrial vehicle, prior to loading the freight into a container.

Industrial vehicles, such as forklifts, lift and move freight, typically mounted on pallets, from warehouses or like venues into containers for transport by land, rail, water, and air, etc. Recipients of the freight are typically charged by the dimensions (volume) and weight of the freight. As such, the freight is often dimensioned and/or weighed prior to loading. Knowing the dimensions of the freight is also useful for determining the order in which the freight is to be loaded, and to fill as much of the container as possible for efficient handling and distribution.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
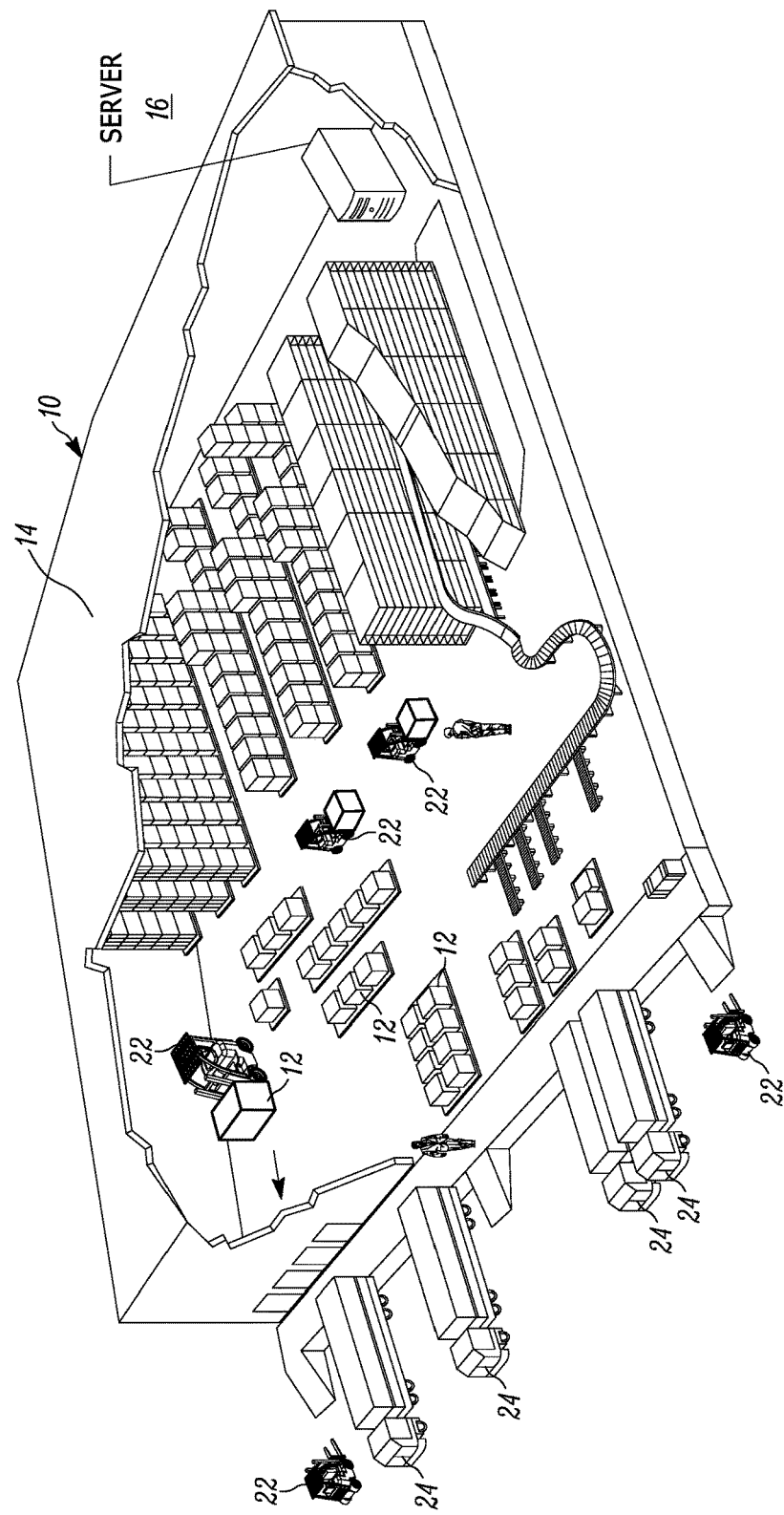
FIG. 1 is a broken-away, perspective, schematic view, as seen from above, of a warehouse in which freight in motion along an unconstrained path is dimensioned in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of the illustrated embodiments.

The system and method components have been represented where appropriate by conventional symbols in the drawings, showing only those specific details that are pertinent to understanding the illustrated embodiments so as not to obscure the disclosure with details that will be readily apparent to those of ordinary skill in the art having the benefit of the description herein.

DETAILED DESCRIPTION OF THE INVENTION

In some known systems, a forklift lifts and advances freight to a dimensioning station while waiting for access to the dimensioning station. The forklift then stops and lowers the freight onto the dimensioning station, and then retreats and backs away from the dimensioning station while the freight is being dimensioned. While the freight is stationary at the dimensioning station, a set of overhead laser scanners with range finders are moved above and past the freight over a time period during which the freight is scanned, and range information from the freight is captured. The range information is processed by processing equipment to obtain dimensions of the freight. After the scanning, the forklift starts again, returns to the station, lifts the freight off the station, and then advances to the container into which the freight is to be loaded. Although generally useful, this known dimensioning procedure has drawbacks not only due to the high cost of the scanners and associated processing equipment, but also, perhaps more importantly, due to the interrupted movement of the freight. As described, the forklift repeatedly stops and starts, and the scanning/dimensioning of each item of freight takes a non-negligible amount of time to be performed. This loading procedure for the container is thus delayed.

In some known systems, packages are placed directly on a moving conveyor belt to advance the moving packages along a constrained, fixed, known path, and at a known speed, and with an unchanging orientation, through a dimensioning station. As each package moves by increments through the dimensioning station, one or more ranging measurements are taken for each increment, thereby resulting in a multitude of such ranging measurements that are then combined and processed correctly to obtain accurate, overall dimensions of each package. Although generally useful, this known dimensioning procedure has drawbacks, because it takes a non-negligible amount of time to place the packages on, and to remove the packages from, the conveyor belt. This loading procedure for the container is thus delayed.

Accordingly, it would be desirable to expedite, and more efficiently conduct, the loading procedure, and to dimension the freight in an uninterrupted, frictionless, continuous, rapid, and more cost-effective and flexible manner prior to loading, preferably while the freight is being moved by a forklift or like industrial vehicle.

Example methods and apparatus disclosed herein provide a dimensioning system for dimensioning moving freight along an unconstrained path in a venue, such as a warehouse or a like facility, either indoors or outdoors. An example dimensioning system disclosed herein includes a ranging system for capturing a plurality of successive point clouds from the moving freight, a tracking system for tracking a plurality of successive positions and orientations of the moving freight, and a computing device (e.g., a server, processor, or programmed microprocessor) in communication with the ranging and tracking systems. In operation, the computing device correlates each successive point cloud with each successive position and orientation of the moving freight, combines the correlated point clouds to obtain a composite point cloud of the moving freight, and processes the composite point cloud to dimension the moving freight. Advantageously, the tracking system assigns a time stamp to each successive position and orientation of the moving freight, and correlates each successive point cloud with each successive time-stamped position and orientation of the moving freight. Once the freight is dimensioned, it may, for example, be efficiently loaded into a container, typically for transport by land, rail, water, and air, etc.

In some examples disclosed herein, a freight mover, such as a forklift, moves the freight along the unconstrained path in the venue through a dimensioning zone past the ranging and tracking systems. The ranging system includes one or more three-dimensional (3D) cameras stationarily mounted in the venue and deployed about the dimensioning zone through which the freight is moved. Each 3D camera has a field of view over which each point cloud is captured from the freight. The 3D cameras have camera sensors directed at the moving freight along different lines of sight. The composite point cloud includes data points from the freight and from the freight mover, and the computing device is operative for extracting the data points from the freight mover from the composite point cloud, for enclosing the extracted composite point cloud with a bounding box having dimensions, and for dimensioning the moving freight from the dimensions of the bounding box.

The tracking system includes a detector mounted on the freight mover or in the venue, and detects each successive position and orientation of the moving freight. In some embodiments, the tracking system includes an emitter for emitting a signal, and the detector detects the emitted signal. In some embodiments, either one of the emitter or the detector is mounted on the freight mover for joint movement therewith, and the other of the emitter and the detector is mounted in the venue remotely from the freight mover. In some embodiments, the emitter includes one or more light emitting diodes (LEDs) mounted on the freight mover for emitting light in a predetermined light pattern, and the detector includes one or more cameras stationarily mounted in the venue for detecting the predetermined light pattern. In some embodiments, the detector includes a camera mounted on the freight mover, and the camera images one or more features arranged at known, fixed locations in the venue to locate each successive position and orientation of the moving freight.

In accordance with this disclosure, dimensioning the freight does not require the freight to be held stationary at a dimensioning station. Nor does the freight have to be moved along the constrained path of a conveyor belt, or have to be loaded onto the conveyor belt and be unloaded therefrom to be dimensioned. Rather, example methods and apparatus disclosed herein enable dimensioning of the freight while the freight is in motion, for example, while being continuously advanced to the container, thereby expediting the loading procedure and rendering the loading procedure more efficient.

An example method disclosed herein is directed to dimensioning a moving freight in motion along an unconstrained path in a venue. The example method includes capturing a plurality of successive point clouds from the moving freight, tracking a plurality of successive positions and orientations of the moving freight, correlating each successive point cloud with each successive position and orientation of the moving freight, combining the correlated point clouds to obtain a composite point cloud of the moving freight, and processing the composite point cloud to dimension the moving freight.

Turning now to the drawings, FIG. 1 schematically depicts a venue 10, such as a warehouse or a like facility, either indoors or outdoors, in which freight 12, depicted as cuboid cartons for simplicity, are moved, for example, by freight movers, such as industrial vehicles, e.g., forklifts 22 having powered, pronged platforms to lift and lower the freight 12. As shown in FIGS. 1-2 and 4-5, the forklifts 22 move the freight 12 below a ceiling 14 of the venue 10 through at least one dimensioning zone or station 18 on, and adjacent, a floor of the venue 10 where the moving freight 12 is dimensioned, as described in detail below. In some instances, the dimensioning zones 18 are situated at or near doorways or portals of the venue 10, e.g., adjacent loading bays or docks, and the freight 12 is moved by the forklifts 22 to containers, such as trailers to be transported by trucks 24, vans, railroad cars, boats, airplanes, etc. The freight movers need not only be forklifts 22, but can be any vehicle (e.g., an aerial vehicle, such as a drone), either manually or motor-powered, either driven by personnel or operated autonomously, such as by a robot or computing device. The freight movers need not be a vehicle at all, and can include personnel who carry the freight 12 from place to place by hand. Each freight mover has freedom of movement and can move the freight 12 along an unconstrained path, e.g., the freight mover can go forward or back, can stop and start, can turn right or left, can change direction, can travel at any speed, and can change the position and orientation of the freight 12 during such travel.

In the illustrated example, the moving freight is dimensioned while in motion by a dimensioning system that includes a ranging system for capturing, as described below in connection with FIG. 2, a plurality of successive point clouds from the moving freight 12, a tracking system for tracking, as described below in connection with FIGS. 4-5, a plurality of successive positions and orientations of the moving freight 12, and a computing device 16 (e.g., a server, processor, or programmed microprocessor) in communication with the ranging and tracking systems. As shown in FIG. 1, the computing device or host server 16 is typically located in a backroom at the venue 10, and includes one or more programmed computing devices and is in wired, wireless, direct, or networked communication with the ranging and tracking systems. The server 16 is preferably a local computer, but can also be a remote cloud server. The server 16 may include a wireless RF transceiver that communicates with the ranging and tracking systems. For example, Wi-Fi and Bluetooth® are open wireless standards for exchanging data between electronic devices. Although depicted as a host server 16 in FIG. 1, any suitable type of computing device is possible.

Figure 2:
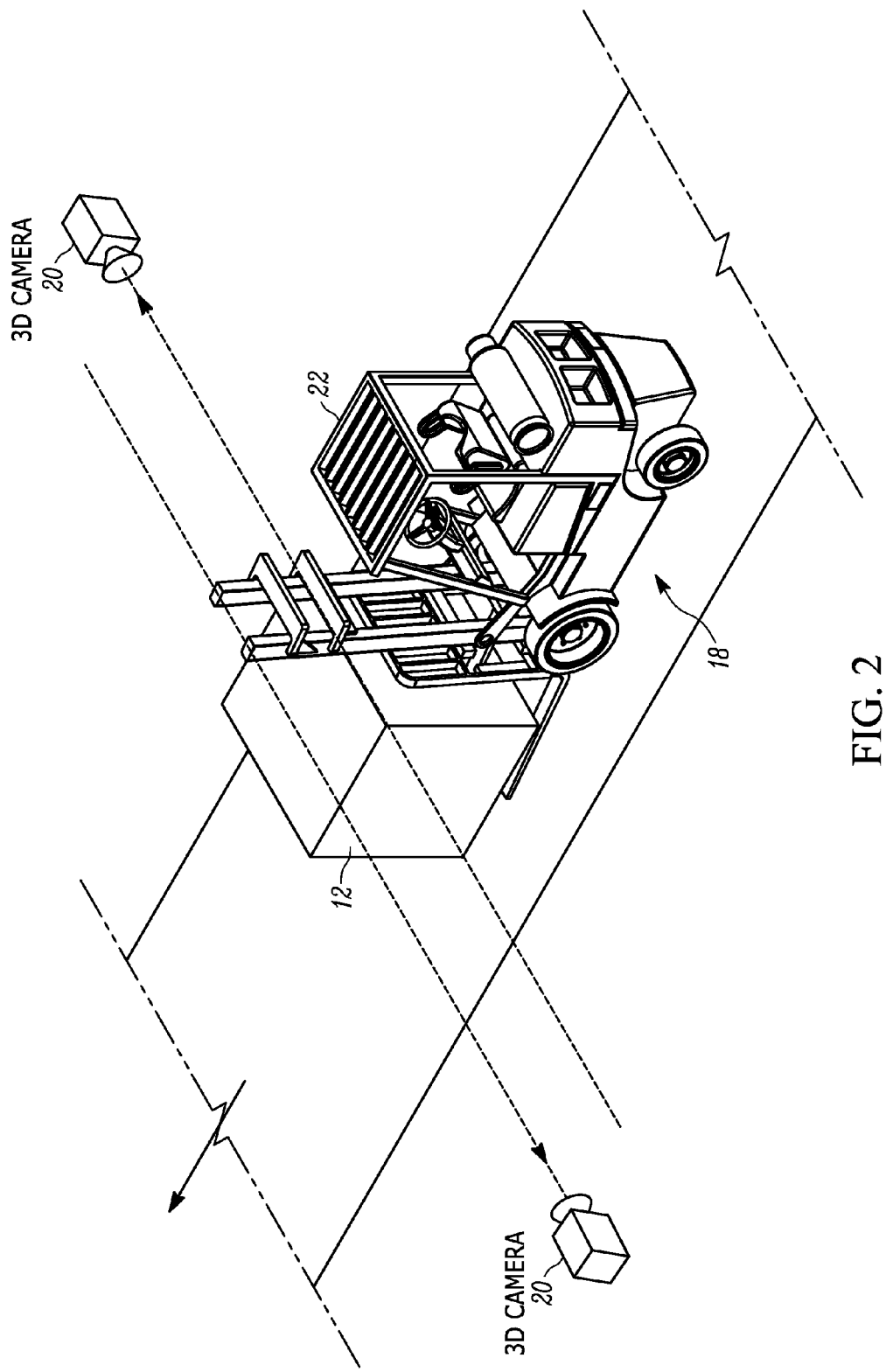
FIG. 2 is an enlarged, perspective view, as seen from above, of a forklift moving freight past a ranging system in a dimensioning station of the warehouse of FIG. 1.
Figure 3:
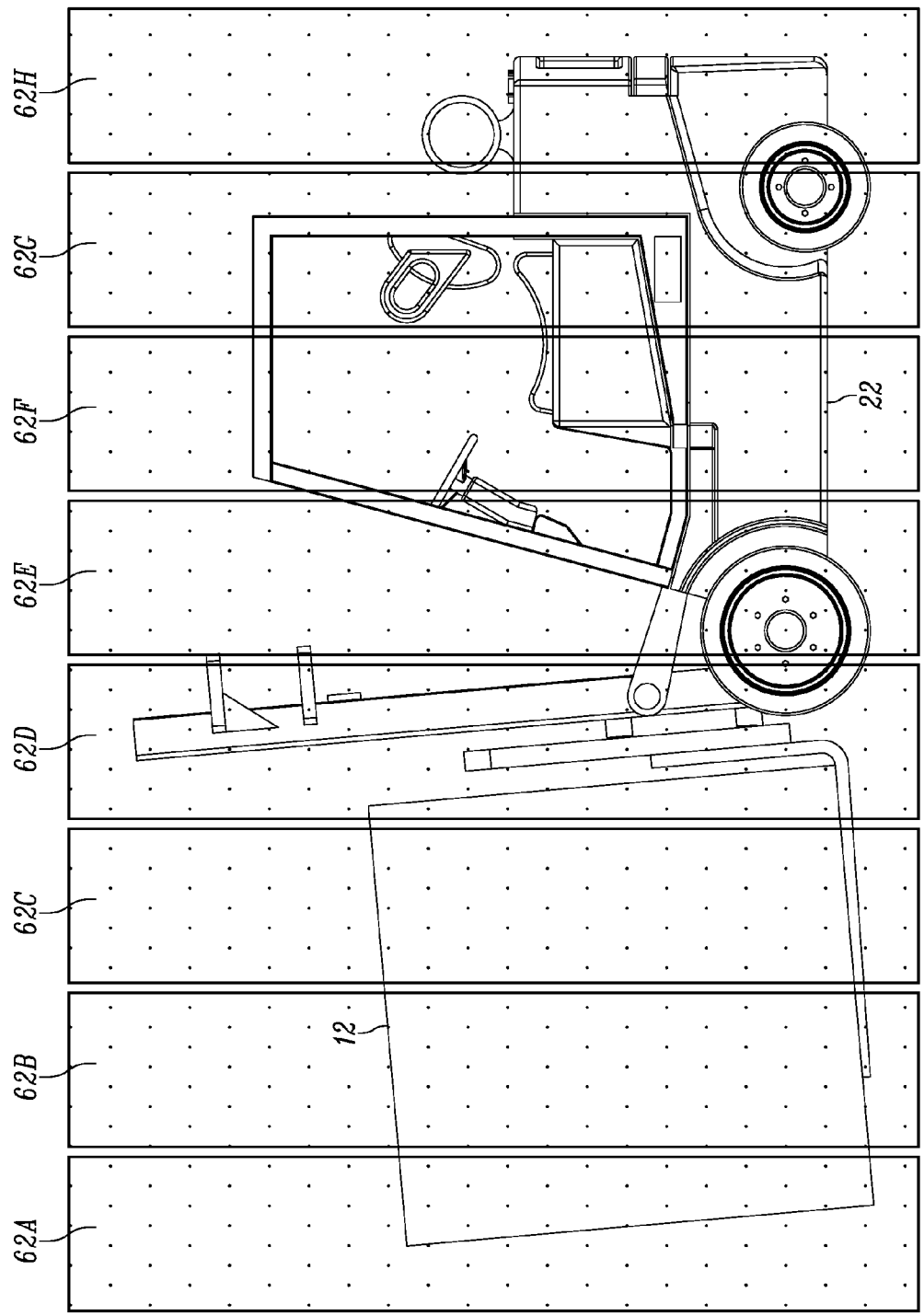
FIG. 3 is an enlarged, side view of a plurality of incremental images of point clouds captured by the ranging system of FIG. 2.

As shown in the example embodiment of FIG. 2, the ranging system includes one or more three-dimensional (3D) cameras 20 stationarily and fixedly mounted in the venue 10, for example, at opposite sides of the dimensioning zone 18 close to floor level as shown, and/or overhead on, or adjacent, the ceiling 14, above the dimensioning zone 18. The 3D cameras 20 are deployed about the dimensioning zone 18 through which the freight 12 is conveyed to the container and are pointed at the freight 12 along different, intersecting lines of sight. The 3D cameras 20 may either face the freight 12 directly along direct paths as illustrated, or indirectly along folded paths using field mirrors. The 3D cameras 20 have sensors with angular fields of view each generally centered on a respective line of sight. As described below, the 3D cameras 20 capture a plurality of point clouds 62A-62H (see FIG. 3) of voxels or data points from the forklift 22 and the moving freight 12. Alternatively, one or more of the 3D cameras 20 is pointed at the freight 12 along the same line of sight and capture different point clouds by operating their sensors at different wavelengths.

In the illustrated example, each 3D camera 20 incorporates time-of-flight (TOF) technology in which the sensor is a two-dimensional array of sensors or pixels, such as a charge coupled device (CCD) or a complementary metal oxide semiconductor (CMOS) device, together with an active modulated light source, such as a solid-state laser or a light emitting diode (LED) operating in the near-infrared range, e.g., between 700 nm and 1000 nm. The light source illuminates the freight 12 with outgoing illumination light, and the reflected return light is captured. The phase shift between the outgoing and the return light is measured and translated into range values indicative of distances (depth) between the 3D camera 20 and the freight 12. In addition to or in lieu of the 3D cameras 20 having TOF technology, other 3D technologies, such as stereo vision and structured-light may also be employed. In some embodiments, a bank of two-dimensional cameras replaces a single 3D camera. In some examples, the 3D cameras 20 are not all identical, but are of different types, and are arranged in any combination.

In the illustrated example, the server 16 sequentially operates each 3D camera 20 to capture a plurality or set or collection of incremental point clouds 62A-62H (see FIG. 3) of voxels or data points from the combination of the forklift 22 and the moving freight 12. Each voxel or data point is associated with a set of coordinates, for example, Cartesian coordinates (x, y, z) that together define a position of each data point. Each voxel or data point also has a range or depth value indicative of a distance between a respective 3D camera 20 and the freight 12/forklift 22 combination, and/or an intensity value indicative of a received signal strength captured by the respective 3D camera 20 from the freight 12/forklift 22 combination.

The server 16 combines each of these incremental point clouds 62A-62H together to dimension the freight 12. Known systems may use overlaps between successive point clouds to align the successive point clouds by executing an iterative closest point (ICP) algorithm. However, this is a computationally intensive and time-consuming task that requires not only a large amount of redundant information to be captured and processed, but also a generous overlap between successive point clouds, which might not be available, especially if sensors having narrow fields of view are employed in the 3D cameras 20. The unconstrained movement of the freight 12 further complicates this task, because such overlaps might often not be available, and there may be no available or reliable alignment information among the successive point clouds. For example, the server 16 does not know whether the freight 12 has gone forward or back, or has stopped and started, or has turned right or left, or has changed direction, or has changed speed, or has changed its position and orientation during its travel.

Figure 4:
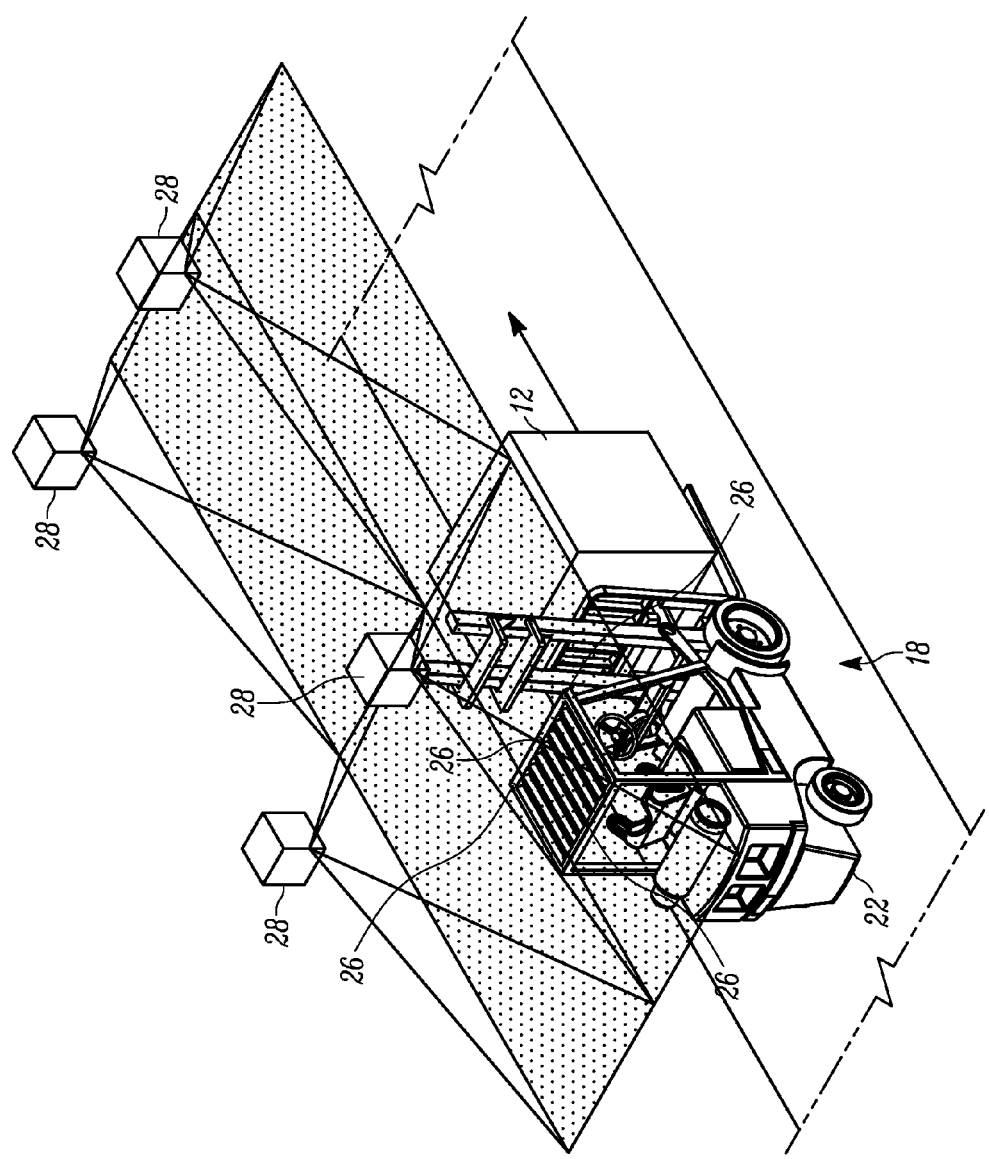
FIG. 4 is an enlarged, perspective view, as seen from above, of a forklift moving freight past one embodiment of a tracking system in the dimensioning station of the warehouse of FIG. 1.
Figure 5:
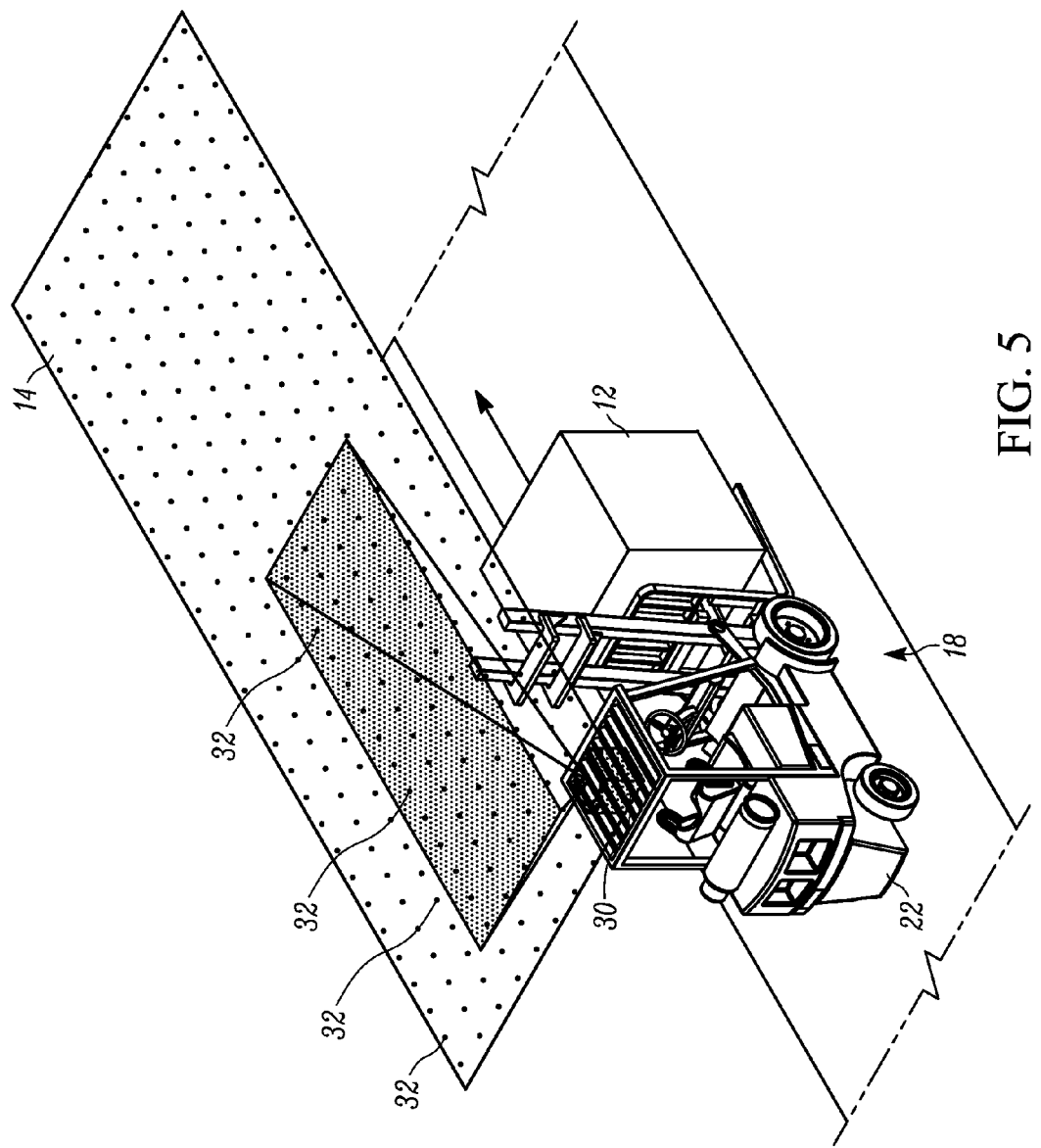
FIG. 5 is an enlarged, perspective view, as seen from above, of a forklift moving freight past another embodiment of a tracking system in the dimensioning station of the warehouse of FIG. 1.

To supply such alignment information, the example tracking system of FIGS. 4-5 includes a detector mounted on the freight mover 22 or in the venue 10, and detects each successive position and orientation of the moving freight 12. In the embodiment of FIG. 4, an emitter includes one or more light emitting diodes (LEDs) 26 mounted on a roof of the freight mover 22 for emitting light in a predetermined light pattern, and the detector includes one or more cameras 28 stationarily mounted overhead in the venue 10 for detecting the predetermined light pattern of the emitted light. As shown in the illustrated example, three LEDs 26 are mounted in a row at a leading edge of the roof, and a fourth LED is mounted centrally at a trailing edge of the roof. Other patterns of the LEDs are contemplated. The LEDs need not only be mounted on the roof, but could be mounted anywhere on the forklift 22. In some examples, the overhead cameras 28 recognize the pattern of the LEDs and the direction of advancement of the forklift 22. In the embodiment of FIG. 5, the detector includes an upwardly-facing camera 30 mounted on the roof of the freight mover 22, and the camera 30 images predetermined features 32 arranged at known, fixed locations, e.g., overhead on the ceiling 14, of the venue 10 to locate each successive position and orientation of the moving freight 12. The tracking system need not be light-based as shown in FIGS. 4-5. For example, ultrasound emitters and receivers could be used to track the forklift 22. As another example, radio frequency transmitters and receivers could be used to track the forklift 22.

The example server 16 correlates each successive point cloud with each successive position and orientation of the moving freight 12, combines the correlated point clouds to obtain a composite point cloud of the moving freight 12, and processes the composite point cloud to dimension the moving freight 12. Advantageously, the tracking system assigns a time stamp to each successive position and orientation of the moving freight 12, and correlates each successive point cloud with each successive time-stamped position and orientation of the moving freight 12. More particularly, the cameras 28, 30 operate at a frame rate, e.g., 30-60 frames per second or Hertz, and the time associated with each frame corresponds to the time that each successive position and orientation is acquired by the cameras 28, 30.

Figure 6:
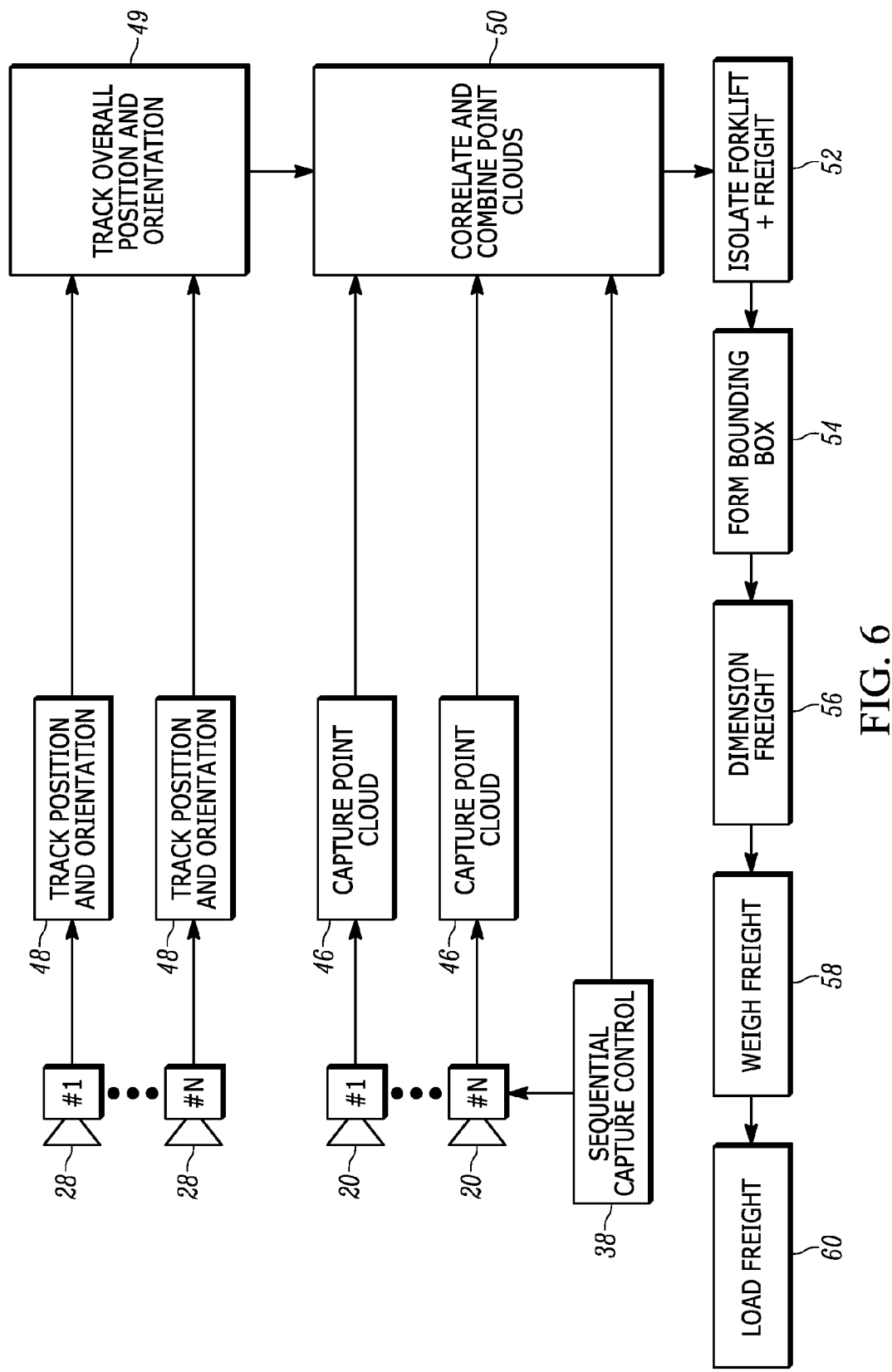
FIG. 6 is a block diagram depicting a method of dimensioning freight in motion along an unconstrained path in the warehouse of FIG. 1.
Figure 7:
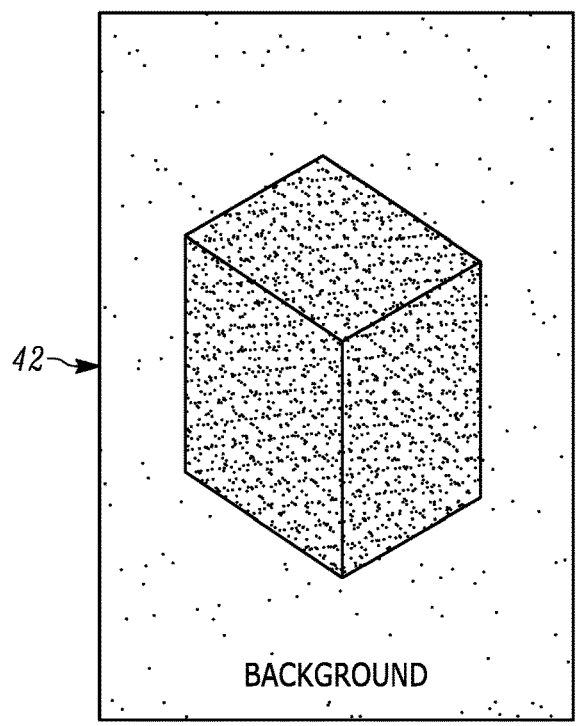
FIG. 7 is a perspective view of a composite point cloud captured by the ranging system of FIG. 2.
Figure 9:
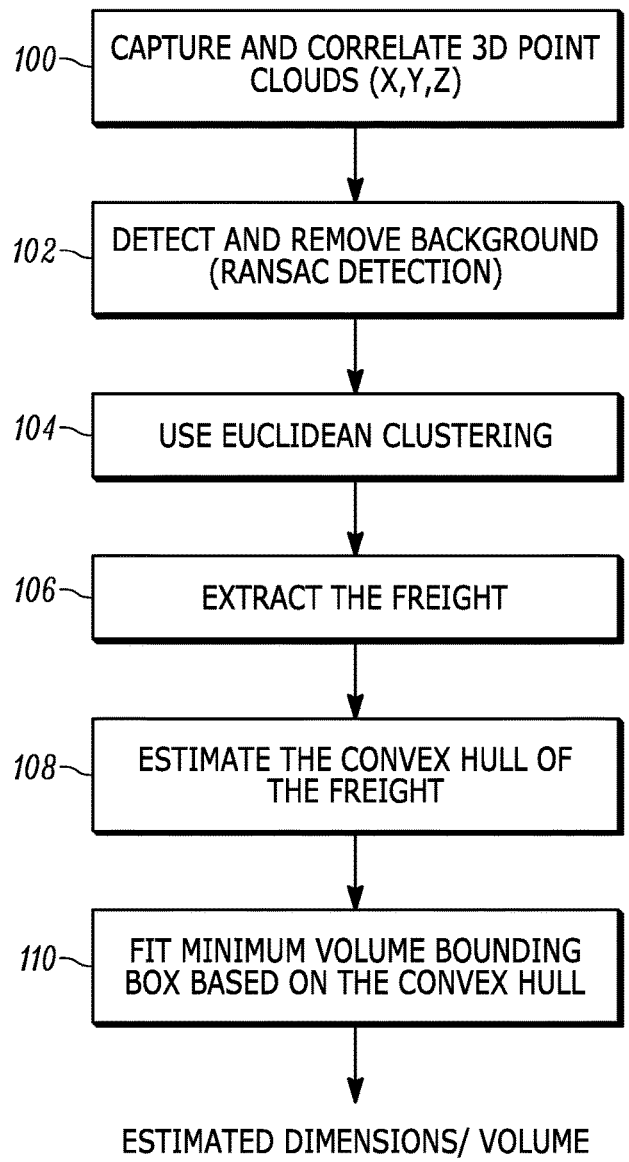
FIG. 9 is a flow chart depicting steps of a method in accordance with this disclosure.

More particularly, the server 16 estimates the dimensions of the moving freight 12 by executing one or more dimensioning algorithms, as schematically illustrated in FIG. 9, on the data points of the captured and correlated point clouds. Thus, as shown in the block diagram of FIG. 6, each one (1 . . . n) of the 3D cameras 20 captures the point clouds (blocks 46). The server 16 commands each of the 3D cameras 20 of FIG. 6 to sequentially operate (block 38). Each successive point cloud includes data points from the freight 12 and from the background, e.g., from the forklift 22 and other environmental structure. In addition, each one (1 . . . n) of the cameras, e.g., cameras 28 of FIG. 4, tracks a plurality of successive positions and orientations and corresponding times of the moving freight 12 (blocks 48), and aggregates all the positions and orientations and corresponding times from all the cameras 28 (block 49). The server 16 correlates each successive point cloud with the aggregated time-stamped position and orientation of the moving freight 12, and combines the correlated point clouds to obtain, as shown in FIG. 7, a combined point cloud 42 that includes data points from the freight 12 and from the background, e.g., the forklift 22 and other environmental structure (block 50).

Figure 8:
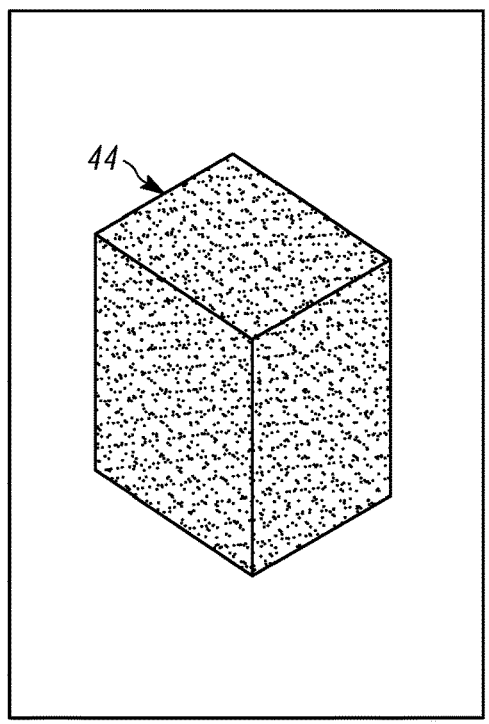
FIG. 8 is a perspective view of a minimum bounding box containing a composite point cloud.

The data points from the background are separated from the data points from the freight 12, and removed to form, as shown in FIG. 8, a composite point cloud 44 of just the freight 12 (block 52). As shown in FIG. 9, after the point clouds have been captured and correlated (block 100), the detecting of the background is performed (block 102) by determining from the data points the plane having the largest area in the field of view, e.g., by executing a random sampling consensus (RANSAC) algorithm. Details of plane detection by using the RANSAC algorithm can be had by reference to "*Plane Detection in Point Cloud Data*", by Yang et al., Technical Report No. 1, Department of Photogrammetry, University of Bonn, Jan. 25, 2010, the entire contents of which is incorporated herein by reference.

Once the base plane or background has been detected, the data points of the base plane are removed from the combined point cloud 42. The remaining data points are then clustered, e.g., by Euclidean clustering (block 104). That is, a multitude of the data points are organized into groups that share a similarity, e.g., a distance or closeness to each other. With the data points clustered, the freight 12 is extracted and located (block 106).

The server 16 forms a minimum bounding box (see also FIG. 8) about the composite point cloud 44 (block 54). The bounding box has height, width, and depth dimensions, and these dimensions, as determined from the bounding box, are used to dimension the freight 12 (block 56). More particularly, the extracted, clustered data points belonging to the freight 12 are processed to obtain a convex hull (block 108). The convex hull constitutes only those exterior data points located on the outside boundary or envelope of the data points belonging to the freight 12. In the illustrated example, the convex hull of the freight 12 is determined, and the remaining interior data points of the data points belonging to the freight 12 inside the convex hull are discarded.

The bounding box is fitted to enclose the convex hull with a minimum volume (block 110). In the illustrated example, the bounding box has a rectangular parallelepiped or cuboid shape having three pairs of mutually orthogonal planar faces, and is fitted around the convex hull. As can be seen in FIG. 8, the volume of the bounding box closely matches the dimensions or volume of the extracted, clustered data points of the freight 12, thereby accurately dimensioning the freight 12. The bounding box is oriented with certain facial constraints. Specifically, at least one of the faces of the bounding box, e.g., a top face, is oriented to be generally parallel to the floor, and simultaneously one of the other faces of the bounding box, e.g., a side face, is oriented to be orthogonal to the top face.

In the illustrated example, the freight 12 is weighed (block 58). Alternatively, the weighing is performed either prior to, or during, the dimensioning. In the illustrated example, the freight 12 is efficiently loaded into a container, typically for transport by land, rail, water, and air, etc. (block 60).

In the foregoing specification, specific embodiments have been described. However, one of ordinary skill in the art appreciates that various modifications and changes can be made without departing from the scope of the example methods and apparatus disclosed herein. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A dimensioning system for dimensioning a moving freight in motion along an uninterrupted path in a venue, the dimensioning system comprising:
   a ranging system having one or more dimensioning sensors mounted in a dimensioning zone of the venue configured to capture a plurality of successive point clouds representative of distances between the one or more dimensioning sensors and the moving freight;
   a tracking system having one or more positioning sensors configured to track a plurality of successive positions and orientations of the moving freight; and
   a computing device in communication with the ranging system and the tracking system, the computing device configured to:
      detect a change in at least one of position and orientation of the moving freight within the dimensioning zone of the venue based on tracking of the moving freight by the tracking system;
      determine spatial alignment of the at least one of position and orientation of the moving freight with corresponding ones of the plurality of successive point clouds by correlating each of the successive point clouds with each of the successive positions and orientations of the moving freight based on detecting the change;
      combine the correlated point clouds to obtain a composite point cloud representative of the moving freight;
      process the composite point cloud to determine a dimension of the moving freight; and
      output the dimension of the moving freight to assist in loading the moving freight, wherein,
         the ranging system and the tracking system detect the moving freight when it moves on a freight mover along the uninterrupted path past the ranging system and the tracking system, and
         the one or more positioning sensors of the tracking system include a detector mounted at one of the freight mover and the venue and configured to detect each of the successive positions and orientations of the moving freight.

2. The dimensioning system of claim 1, wherein the composite point cloud includes data points corresponding to the moving freight and the freight mover, and the computing device is configured to:
   remove the data points corresponding to the freight mover from the composite point cloud;
   after removing the data points corresponding to the freight mover from the composite point cloud, enclose the data points of the composite point cloud with a bounding box having dimensions; and
   dimension the moving freight from the dimensions of the bounding box.

3. The dimensioning system of claim 1, wherein:
   the tracking system include an emitter configured to emit a signal;
   the detector is configured to detect the emitted signal;
   one of the emitter and the detector is mounted on the freight mover for joint movement therewith; and
   the other of the emitter and the detector is mounted in the venue remotely from the freight mover.

4. The dimensioning system of claim 3, wherein:
   the emitter includes at least one light emitting diode (LED) mounted on the freight mover configured to emit light in a predetermined light pattern; and
   the detector includes at least one camera stationarily mounted in the venue for detecting the predetermined light pattern.

5. The dimensioning system of claim 3, wherein the detector includes a camera mounted on the freight mover, and configured to image at least one feature arranged at a known, fixed location in the venue to locate each of the successive positions and orientations of the moving freight.

6. The dimensioning system of claim 1, wherein the one or more dimensioning sensors of the ranging system include at least one three-dimensional (3D) camera deployed at a location through which the moving freight is moved.

7. The dimensioning system of claim 6, wherein the at least one 3D camera is stationarily mounted in the venue, and the at least one 3D camera includes a sensor pointed at an area of expected travel associated with the moving freight.

8. The dimensioning system of claim 1, wherein the tracking system is configured to:
   assign a time stamp to each of the successive positions and orientations of the moving freight; and
   correlate each of the successive point clouds with each of the successive time-stamped positions and orientations of the moving freight.

9. A method of dimensioning a moving freight in motion along an uninterrupted path in a venue, the method comprising:
   capturing, via one or more dimensioning sensors of a ranging system, a plurality of successive point clouds representative of the moving freight;
   tracking, via one or more positioning sensors of a tracking system, a plurality of successive positions and orientations of the moving freight;
   correlating, via a computing device in communication with the ranging system and the tracking system, each of the successive point clouds with each of the successive positions and orientations of the moving freight;
   combining, via the computing device, the correlated point clouds to obtain a composite point cloud of the moving freight;
   processing, via the computing device, the composite point cloud to determine a dimension of the moving freight; and
   outputting the dimension of the moving freight to assist in loading the moving freight,
   wherein,
      the ranging system and the tracking system detect the moving freight when it moves on a freight mover along the uninterrupted path past the ranging system and the tracking system, and
      the one or more positioning sensors of the tracking system include a detector mounted at one of the freight mover and the venue and configured to detect each of the successive positions and orientations of the moving freight.

10. The method of claim 9, wherein:
    the composite point cloud includes data points representative of the moving freight and the freight mover;
    the processing is performed by:
       removing the data points corresponding to the freight mover from the composite point cloud;
       after removing the data points corresponding to the freight mover from the composite point cloud, enclosing the composite point cloud with a bounding box having dimensions; and dimensioning the moving freight from the dimensions of the bounding box.

11. The method of claim 9, wherein:

the tracking is performed by emitting a signal from an emitter mounted on one of the freight mover and the venue; and the detector detects the emitted signal, the detector mounted on the other one of the freight mover the venue.

12. The method of claim 11, further comprising configuring the emitter with at least one light emitting diode (LED) mounted on the freight mover to emit light in a predetermined light pattern, and configuring the detector with at least one camera stationarily mounted in the venue to detect the predetermined light pattern.

13. The method of claim 9, further comprising configuring the detector with a camera mounted on the freight mover to image at least one feature arranged at a known, fixed location in the venue to locate each of the successive positions and orientations of the moving freight.

14. The method of claim 9, wherein the capturing is performed by deploying at least one three-dimensional (3D) camera at a location through which the freight is moved.

15. The method of claim 14, further comprising stationarily mounting the at least one 3D camera in the venue in an area of expected travel associated with the moving freight.

16. The method of claim 9, further comprising assigning a time stamp to each of the successive positions and orientations of the moving freight, and correlating each of the successive point clouds with each of the successive time-stamped positions and orientations of the moving freight.

17. A method of dimensioning a moving freight in motion along an uninterrupted path in a venue, the method comprising:

capturing, via one or more dimensioning sensors of a ranging system, a plurality of successive point clouds representative of the moving freight;

tracking, via one or more positioning sensors of a tracking system, a plurality of successive positions and orientations of the moving freight;

correlating, via a computing device in communication with the ranging system and the tracking system, each of the successive point clouds with each of the successive positions and orientations of the moving freight;

combining, via the computing device, the correlated point clouds to obtain a composite point cloud of the moving freight;

processing, via the computing device, the composite point cloud to determine a dimension of the moving freight; and outputting the dimension of the moving freight to assist in loading the moving freight, wherein, the ranging system and the tracking system detect the moving freight when it moves on a freight mover along the uninterrupted path past the ranging system and the tracking system, the composite point cloud includes data points representative of the moving freight and the freight mover, and the processing is performed by:

removing the data points corresponding to the freight mover from the composite point cloud, after removing the data points corresponding to the freight mover from the composite point cloud, enclosing the composite point cloud with a bounding box having dimensions, and dimensioning the moving freight from the dimensions of the bounding box.

* * * * *